Figure 1:
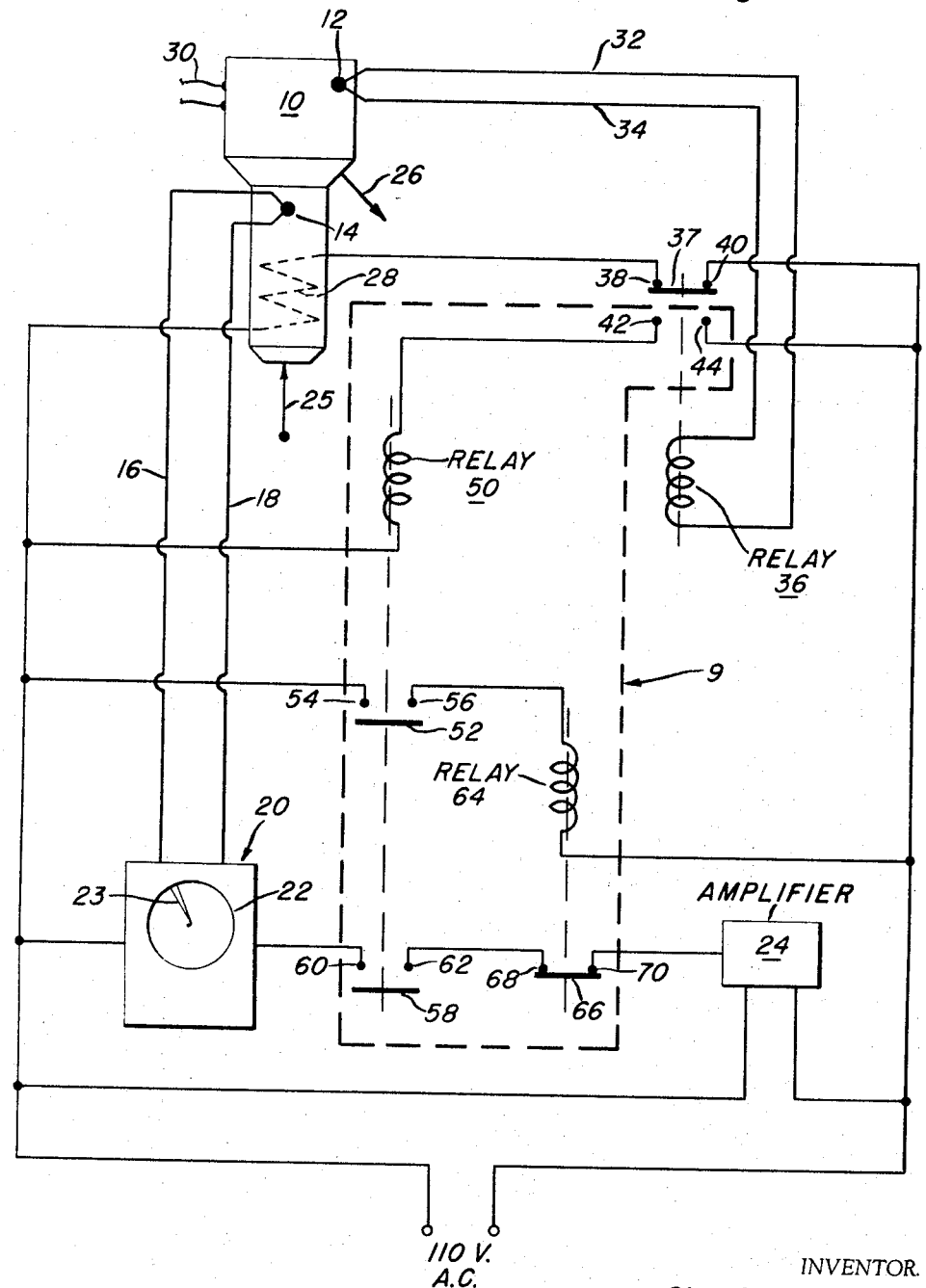
Figure 2:
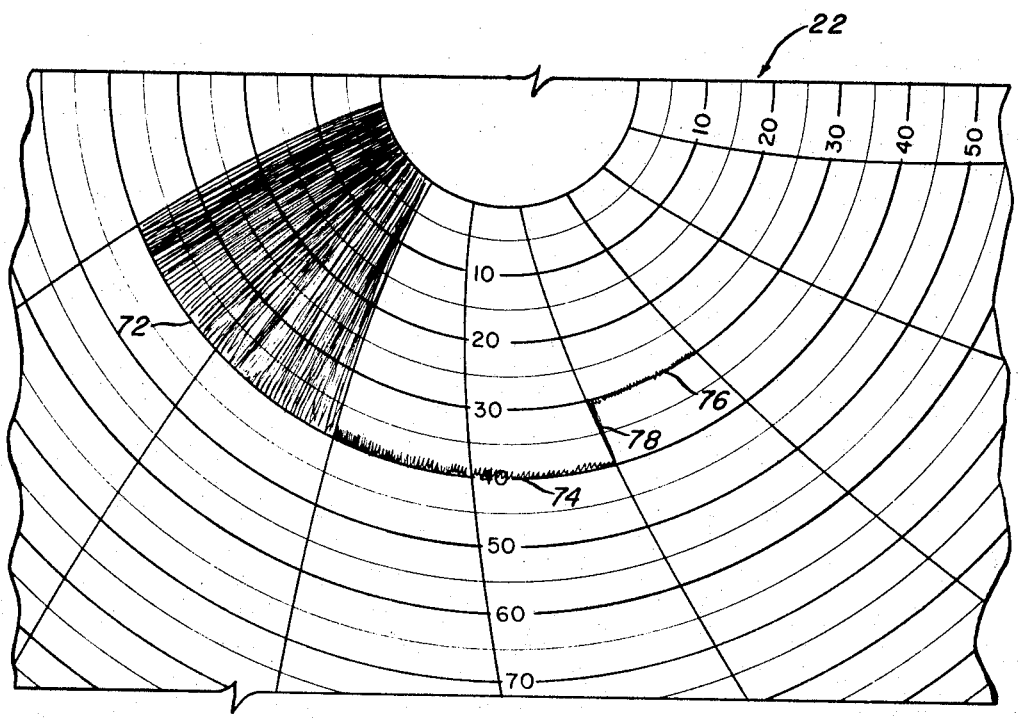

Dec. 31, 1968

S. F. KAPFF 3,418,842

PEAK TEMPERATURE RECORDING APPARATUS

Filed May 29, 1964

United States Patent Office 3,418,842
Patented Dec. 31, 1968

3,418,842
PEAK TEMPERATURE RECORDING APPARATUS
Sixt Frederick Kapff, Homewood, Ill., assignor to Standard Oil Company, Chicago, Ill., a corporation of Indiana
Filed May 28, 1964, Ser. No. 370,928
2 Claims. (Cl. 73—36)

This invention relates to an apparatus for recording essentially only peak temperatures from a cyclic temperature signal and more particularly to an apparatus for producing a continuous record of peak temperatures from flash-point testers, pour-point testers, and the like.

Devices for measuring flash-point or pour-point temperatures commonly produce temperature signals in cyclic form or as "spikes" with the peaks of the spikes representing the flash point or pour point of the sample. Recording the entire spike tends to detract from the primary importance of the peak data and limits the usefulness of the data for automatic control purposes. A simple yet reliable apparatus is desired to act in conjunction with a tester and recorder so that essentially only the peak data from the cyclic signal are recorded.

Briefly, the invention is a peak temperature recording means including a relay means which effectively connects the cyclic temperature signal from the tester to the recording pen essentially only at the peak-data points of the signal. The relay means is connected to a signal generating means and to an electrical circuit means, and has a first position wherein the circuit means is deactuated, and a second position wherein the circuit means is actuated and the signal is recorded. The relay means also has a delay means which after a short delay time returns the relay means to its first position and deactuates the electrical circuit means. The result is a continuous record of essentially only the flash-point or pour-point temperatures of the sample, which temperatures conveniently can be used for automatic control purposes. As will be noted in the detailed discussion below, the inventive apparatus produces the desired result in a simple yet reliable manner.

The invention will be described in more complete detail and additional benefits thereof will become apparent in the ensuing description read in conjunction with the accompanying drawing wherein:

FIGURE I is a schematic drawing of a representative apparatus used for measuring and recording flash-point temperatures.

FIGURE II is a chart showing the difference in the records produced by a prior art apparatus and those produced by the apparatus of this invention.

In FIGURE I, the flash cup of a conventional flash-point tester and recorder is shown; however, modifications have been made in its electrical circuit so that the recording pen is actuated essentially only at the peak temperature signals from the flash-point tester. The modifications in the circuit are within the dotted enclosure.

In FIGURE I, flash-point tester 10 serves to illustrate a temperature measuring apparatus in which a cyclic temperature signal is generated. Means for sensing temperture in flash-point tester 10 and for generating an electrical signal based on the temperature are represented by thermocouples 12 and 14, the first being positioned in the vapor space above the liquid sample. Thermocouple 12 serves as a means for sensing the flash-point conditions above the sample and for generating a first electrical signal. This signal is relatively large because of the rapid temperature rise when combustion occurs in the vapor at flash-point conditions.

Thermocouple 14 serves as a means for sensing the temperature of the sample and for generating a second electrical signal based on that temperature. The signal from thermocouple 14 is fed via wires 16 and 18 to recording means 20 having chart 22, pen 23, and a balancing motor arrangement (not shown). The balancing motor and amplifier 24 represent an electrical circuit means for connecting the temperature sensing means, in this instance thermocouple 14, to recording pen means 23. The electrical circuit means plus the pen means 23 represent the means for recording the electrical signal from the thermocouple 14. In the operation of the inventive apparatus, the electrical circuit is in a normally off position.

A relay means is provided to effectively provide power to the positioning mechanism of recording pen 23 essentially only when the peak signal is being generated. The relay means includes a first relay means represented by relay 50 and a second relay means represented by relay 64 together with the associated circuits. The first relay means 50 is actuated by the electrical signal generated at the peak-temperature conditions and actuates both the electrical circuit means 58 and the second relay means 64. The second relay means 64 serves to deactuate the electrical circuit means and thereby effectively disconnects the power from positioning mechanism of recording pen 23; however, action of the second relay means is delayed by a timed delay means and a recording of the peak-temperature signal takes place during this delay period.

In the operation of flash-point tester 10, a sample is introduced via inlet 25 and removed via outlet 26. Heating coil 28 serves as a means for heating the sample from a first temperature to its flash-point temperature or peak temperature. Ignition means 30 represents a means for momentarily generating a visible ignition above the sample for determining the existence of flash-point conditions above the sample. The rapid rise in temperature in the vapor space when flash-point conditions are reached induces a significant signal in thermocouple 12 which is fed via wires 32 and 34 to relay 36. Relay 36 serves as a relay means to actuate the first relay means, represented by relay 50, and to disconnect the heating means represented by coil 28. Thermocouple 12 therefore serves as part of the temperature sensing means which is triggered at the flash-point or peak temperature and causes the actuation of relay means 36. The relay means 50, discussed in more detail below, acts to connect the power to the positioning mechanism actuating pen 23 for a short time in which the flash-point or peak temperature of the sample is recorded.

The actuation of relay 36 by thermocouple 12 provides the force to move switch 37 from contact points 38 and 40 to contact points 42 and 44. Relay 36 locks in this position even though thermocouple 12 cools rapidly after the flash. This results in the deactuation of the heating means represented by coil 28 and the actuation of the relay means 50 to connect power to the positioning mechanism of recording pen 23. The deactuation of coil 28 permits the temperature of flash-point tester 10 to return to a lower value prior to the start of another test. It will be understood that there is sufficient residual heat in the flash-point tester to maintain the flash point or peak temperature of the sample after the heating means represented by coil 28 has been deactuated.

The connection between points 42 and 44 actuates a relay means principally represented by first relay 50, second relay 64 and associated contacts. As noted from FIGURE I, the relay means is connected to relay 36 and to amplifier 24 and a balancing motor (not shown) of the electrical circuit means. The actuation of relay 50 provides the force to move switch 52 to contact points 54 and 56, and switch 58 to contact points 60 and 62, the first action actuating relay 64 and the second connecting amplifier 24 to the positioning motor of pen 23. At this moment, pen 23 records the signal from thermocoupler 14 which essentially represents the flash point or peak temperature of the sample.

Relay 64 is connected to the electrical circuit means by switch 52 having contact points 54 and 56. Relay 64 has a delay means which delays the movement for a short time of switch 66 away from contact points 68 and 70. At this time the power is removed from the positioning mechanism and recording pen 23 no longer responds to the signal from thermocouple 14 but remains at a constant position on chart 22 until moved to a new position by the reconnection of power to the positioning means through relays 64 and 50.

The delay means of relay 64 is usually one of the commercial mechanisms available for delaying the action of a relay. Advantageously, a bimetal may be used with a heater. The time for the bimetal to be heated to a particular temperature determines the delay time. Usually, the delay means provides only a short delay in the order of 3–5 seconds.

After a predetermined time (by program timer means not shown) relay 36 is reset to close contacts 38 and 40 which provide power to heater 28 to start cycle again. This resetting of 36 removes power from relays 50 and 64 returning them to their normal positions. The deactuation of relay 50 permits switches 52 and 58 to return to their first positions and causes the deactuation of relay 64 permitting switch 66 to return to its previous position. The system is now ready for reactuation by the signal from the thermocouple 12 when the flash-point conditions are reached.

In FIGURE II, chart 22 shows the record 72 produced by the recorder 20 without the inventive apparatus and the record 74 produced by recorder 20 with the inventive apparatus. Record 72 illustrates the cycling effect when the signal from thermocouple 14 is continuously connected to pen 23. Record 74 shows the peak temperatures recorded when the temperature signal from thermocouple 14 is connected to pen 23 essentially only during the peak having flash-point temperatures of the sample. When the sample changes in flash-point temperatures from that represented by record 74 to that represented by record 76, the pen moves via line 78 to the new flash-point temperature 76. The records at 74 and 76 are convenient records of the flash-point temperatures without the distraction of the cyclic values shown by record 72. In addition, as indicated by the records of 74 and 76, the signals are in a very convenient form for control purposes, since essentially only the peak-data points are recorded.

The operation of the above temperature measuring and recording apparatus provides a relatively simple, yet reliable, means of recording essentially only the peak temperatures from a cyclic temperature signal. In brief, the sample is injected via inlet 25 into flash-point tester 10 and heated by coil 28 to its flash-point temperature, after which the coil 28 is disconnected and the flash-point tester 10 permitted to cool to a lower temperature prior to a start of another test. Although cyclic temperature signals are produced by thermocouple 14 essentially only the peak temperatures are recorded by recording pen 23 through the action of the relay means which serves to effectively connect power to the pen positioning mechanism essentially only at the peak or flash-point temperature of the sample.

It is to be understood that the above embodiments are merely some of numerous variations which can be devised on a broad concept by those of ordinary skill in the art, and the claims which are appended hereto are not limited to the specific embodiments described.

I claim:

1. Apparatus for recording essentially only peak data temperature from a source producing a cyclic temperature, said source having a first temperature sensing and electrical signal generating means adapted to continually sense and generate temperature signals based on said cyclic temperature, said apparatus comprising:

(a) second temperature sensing and electrical signal generating means operably connected to said source, said means being adapted to sense only the occurrence of said peak data temperature from said source and generate a peak data temperature signal at the time of said occurrence;

(b) recording pen means;

(c) electrical circuit means operably connected to said recording pen means and said first temperature sensing and electrical signal generating means and adapted to connect power to said recording pen means only upon actuation of said electrical circuit means;

(d) relay means comprising a first relay operably connected to said second temperature sensing and electrical signal generating means and to said electrical circuit means, and a second relay operably connected to said first relay and to said electrical circuit means and having a time delay means, said first relay being actuated by said peak data temperature signal and actuating both said electrical circuit means and said second relay thereby connecting power to said recording pen means, said second relay being actuated by said time delay means after a predetermined interval of time for deactuating said electrical circuit means to thereby remove power from said recording pen means whereby the position of said recording pen means is maintained until the occurrence of the next peak data temperature signal, during which interval of time essentially only said peak data temperature is recorded.

2. A flash point testing and recording apparatus in which a cyclic temperature signal is generated for recording essentially only the flash-point temperature of a sample, said apparatus comprising: (a) means for heating a sample from a first temperature to its flash-point temperature; (b) means for momentarily generating a visible ignition above said sample for determining the existence of flash-point conditions above said sample; (c) means for sensing the flash-point conditions above said sample and for generating a first electrical signal; (d) means for sensing the temperature of said sample and for generating a second electrical signal based on said temperature; (e) means for recording said second electrical signal, said means including chart and pen means and electrical circuit means for connecting power to said pen means, said circuit means being in a normally off position; (f) first relay means operably connected between said flash point sensing and first signal generating means, and said electrical circuit means; (g) second relay means operably connected between said first relay means and said electrical circuit means, and having a time delay means; said first relay means being actuated by said first electrical signal at said flash point and actuating both said electrical circuit means and said second relay means, the latter after a predetermined interval of time deactuating said electrical circuit means, the recording of said second electrical signal occuring within said predetermined interval of time thereby providing a record of essentially only the flash-point temperature of said sample.

References Cited

UNITED STATES PATENTS

| | | | |
|---|---|---|---|
| 2,746,285 | 5/1956 | Greanias | 73—36 |
| 2,746,286 | 5/1956 | Greanias et al. | 73—36 |
| 2,939,312 | 6/1960 | Jacobs et al. | 73—36 |
| 3,011,337 | 12/1961 | McGlynn | 73—36 |
| 3,200,404 | 8/1965 | Ott | 346—62 |

RICHARD C. QUEISSER, *Primary Examiner.*

C. IRVIN McCLELLAND, *Assistant Examiner.*

U.S. Cl. X.R.

346—30, 62